Sept. 16, 1947.   T. H. BLOODWORTH   2,427,587
ELECTRODE FEED MOTOR CONTROL SYSTEM
Filed May 25, 1945

Inventor
Thomas H. Bloodworth
by Harold S. Silver
Attorney

Patented Sept. 16, 1947

2,427,587

UNITED STATES PATENT OFFICE 2,427,587

ELECTRODE FEED MOTOR CONTROL SYSTEM

Thomas H. Bloodworth, Elm Grove, Wis., assignor to Allis-Chalmers Manufacturing Company, Milwaukee, Wis., a corporation of Delaware Application May 25, 1945, Serial No. 595,708

10 Claims. (Cl. 314—75)

This invention relates in general to motor control systems and relates more particularly to a motor control system wherein the controlled motor may be energized to rotate in either of two directions by a generator, the voltage of which is controlled to be of one polarity or the other.

The present invention is particularly applicable and desirable where a motor load is unbalanced, that is, where the motor load, when the motor is rotated in one direction, is different from the motor load when the motor is rotated in the opposite direction. The present control system is also applicable where the loads on the motor are substantially balanced for either direction of rotation of the motor, and where it is desirable to have the control of such motor respond differently when the motor is to be operated in one direction than when it is to be operated in the other direction.

An illustrative example of a motor control system, in which the motor loads are unbalanced dependent upon the direction of rotation of the motor, is found in the prior art control systems for an electrode motor of an electric arc furnace control system. Such electrode motor has been utilized to raise or lower a heavy furnace electrode structure weighing a ton or more, and the weight of the electrode structure reduces the load on the motor when the electrode is being lowered, and increases the load on the motor when the electrode is being raised.

In prior art arc furnace control systems of the type having directionally determined unbalance of loads on the motor, attempts have been made to compensate for the difference in motor loads by providing a biasing field on the generator supplying the motor, whereby the weight of the electrode structure is counterbalanced and the motor normally is slightly energized tending to run the motor to raise the electrode. In such control systems the sensitivity of the control system, when a regulating change in the "raise" direction is required, is different from the sensitivity when a regulating change in the "lower" direction is required.

In other prior art control systems the weight of the electrode structure has been physically counterbalanced by means of a weight attached to the electrode structure by means of cables and pulleys. However, in control systems involving this latter counterbalancing, the added material necessary for the counterbalancing weights and the added space necessary to provide for their operation, bring in definite disadvantages.

It is therefore an object of the present invention to provide a motor control system in which the motor may have directionally determined unbalanced loads, but in which the control for the motor will respond to the same deviation from normal of the regulated quantity, independently of the direction of the rotation of the motor.

It is also an object of the present invention to provide a motor control system, in which the motor may have loads that are unbalanced dependent upon the direction of rotation of the motor, with a control providing the same sensitivity of response independently of the direction in which the motor is to be rotated.

It is also an object of the present invention to provide a motor control system in which the motor loads may be of the same order of magnitude in either direction of rotation of the motor, with a means whereby the control system responds with a different sensitivity dependent upon the direction of rotation of the motor required by a predetermined change in the regulated quantity.

It is also an object of the present invention to provide an arc furnace control system in which the weight of the electrodes is compensated or counterbalanced, but in which the sensitivity of the control, when the electrode motor is required to raise an electrode, is the same as the sensitivity of the control when the electrode motor is required to lower an electrode.

It is also an object of the present invention to provide an arc furnace control system in which the weight of the electrodes is electrically compensated or counterbalanced, but in which the effective energization of the electrode motor is zero when the conditions of the electrode circuit are normal.

Objects and advantages other than those above set forth will be apparent from the following description when read in connection with the accompanying drawing, in which.

Figure 1:
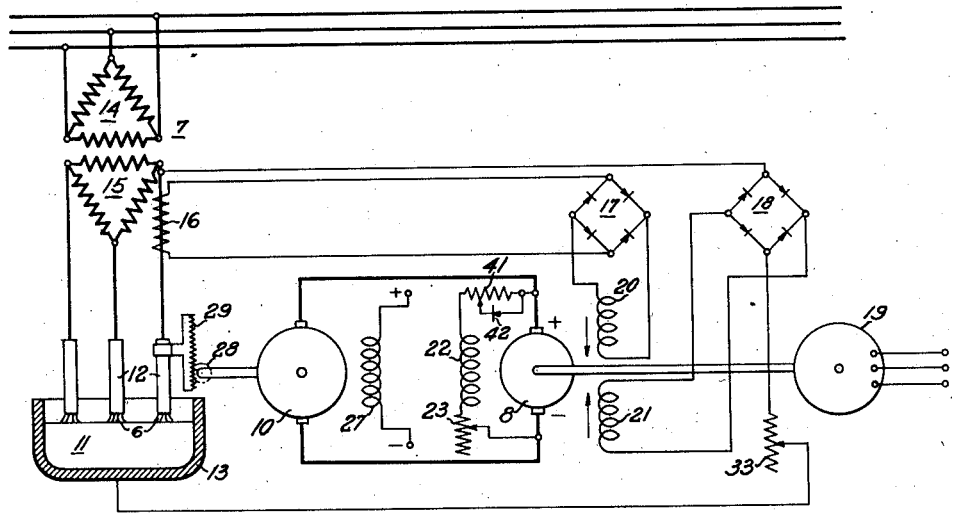
Fig. 1 is a diagram of connections of an arc furnace control system embodying the present invention.

In the illustrative control system shown in Fig. 1, an arc furnace 11 is shown as having movable electrodes 12 that may be raised or lowered by means of a rack 29 and pinion 28 operated by an electrode motor 10. The motor 19 is rotated in one direction or the other dependent upon the polarity of the terminal voltage of a generator 8 provided with control field windings 20 and 21 and with a self-energizing field winding 22. The motor 10 is shown as provided with field energization supplied by a separately excited field winding 27. The generator 8 is driven at a substantially constant speed by suitable means shown as an alternating current motor 19.

The control field windings 20 and 21 on the generator 8 are opposed, as shown by the arrows in Fig. 1, and under normal conditions in the electrode circuit, the net energization supplied by these fields is zero and the terminal voltage of generator 8 is zero. The field winding 20 is energized from a bridge rectifier 17 connected to a current transformer 16 and the field winding 20 is, therefore, responsive to a measure of the arc current supplied from the transformer 7 through the electrode 12. The field winding 21 is connected to a bridge rectifier 18 energized in accordance with the voltage across the arc 6 drawn at the electrode 12 so that the energization of field winding 21 is a measure of the arc voltage at that electrode. Adjustable resistance 33 is utilized to proportion the amount of arc voltage desired at the rectifier 18. A self-energizing field winding 22 on the generator 8 is connected to be energized in accordance with the output voltage thereof to increase the rate of voltage change of generator 8. Each of the electrodes 12 is similarly controlled and operated by a control system and motor such as shown in connection with the right hand electrode.

The self-energizing field winding 22 of the generator 8 has in circuit therewith resistances 23 and 41, the resistance 41 having a portion thereof shunted by a unidirectional current carrying the device 42 which may comprise one or more dry type rectifying devices. When the terminal voltage of the generator 8 is of the polarity as indicated in Fig. 1, current will flow from the positive terminal of generator 8, through device 42, through the left hand portion, as viewed in the drawing, of the resistance 41, field winding 22 and adjustable resistance 23. When the terminal voltage of the generator 8 is of the opposite polarity, current will flow from the lower terminal of generator 8, through the adjustable resistance 23, the field winding 22 and the entire resistance 41, for current will not flow through the rectifier 42 from left to right, as viewed in the drawing.

In the operation of the illustrated system to control the arc furnace 11, if the arc length decreases, the current through the electrode increases, and the voltage across the arc decreases. Thus, the energization of field winding 20 is increased and the energization of field 21 is decreased, and the net effect of such change in energization will produce a voltage at the terminals of the generator 8 such as will run the motor 10 in a direction to raise the electrode 12. The polarity of this terminal voltage will be as indicated in Fig. 1, and current will flow in the shunt field circuit of the machine 8 through the device 42, as above set forth, which device 42 shunts a portion of the resistance 41.

As the resistance of the shunt field circuit is reduced, by reason of current flow through the device 42, the current in the shunt field circuit is at a higher value that if all of the resistance 41 is included in the circuit. Field 22, therefore, provides greater energization, for a given net energization provided by fields 20 and 21, when the polarity of generator 8 is as indicated, than it does when the terminal voltage of the generator 8 is of the opposite polarity.

Conversely, if the arc length increases, the current in the electrode decreases and the voltage across the arc at that electrode increases. Thus the net energization of fields 20 and 21 causes the terminal voltage of generator 8 to be of a polarity opposite to that shown in Fig. 1, thereby energizing the motor 10 in a direction to lower the electrode. Current in the shunt field circuit will then flow through the entire resistance 41, for it cannot flow through the device 42. The current in the shunt field is, therefore, decreased over what it would be for the same magnitude of net energization tending to raise the electrode.

The above operation provides for different operating voltages of the generator 8, for a predetermined net energization provided by fields 20 and 21, dependent upon which field 20 or 21 is predominating, without losing the advantages of zero voltage on the machine 8 when fields 20 and 21 are balanced. By providing greater energization for the field 22 when raising the electrode, the weight of the electrode is electrically counterbalanced or compensated, but the sensitivity of the control remains the same independently of the direction of rotation of the electrode motor 10. When the motor is required to raise the electrode, the sensitivity of the control may be the same as the sensitivity of the control when the motor is required to lower the electrode.

Figure 2:
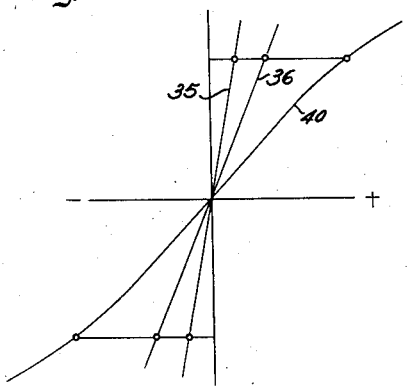
Fig. 2 is a curve depicting the characteristics of the control generator shown in Fig. 1.

The energization of the field 22 in one or the other directions, rapidly increases the rate of voltage change produced by the net effect of fields 20 and 21, and the motor 10 is run at variable speeds in a direction to move the electrode 12 in the desired direction until fields 20 and 21 again balance. The differences in energizations of the field 22 are depicted in Fig. 2, in which the curve 40 illustrates a desirable saturation curve of the machine 8 and the curve 36 depicts a desirable field resistance line when the polarity of generator 8 is such that the rectifier 42 shunts a portion of the resistance 41. The curve 35 depicts a desirable field resistance line when the entire resistance 41 is included in the shunt field circuit. If greater accuracy is desired, the operating range of the saturation curve 40 is made a straight line by any well known means.

Figure 3:
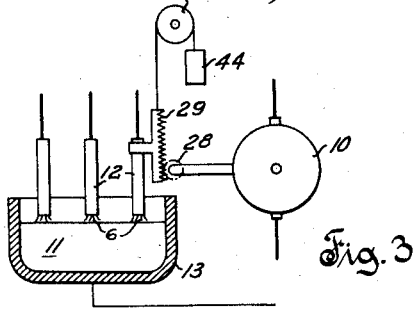
Fig. 3 illustrates a modification of the invention as embodied in Fig. 1.

If the load on the motor 10 is such that it is balanced, relative to the direction of rotation of the motor 10, and if it is desired that the sensitivity of response of the motor control be different dependent upon the direction of rotation of the motor, the direction of the device 42 and the proportionate values of the portions of the resistance 41 may be so adjusted as to give the desired differential response. For example, the weight of the electrodes 12 may be physically counterbalanced, as shown in Fig. 3, by means of a weight 44 connected by a cable over a roll 43. With the motor 10 of Fig. 3 controlled by the control system shown in Fig. 1, the resistance 41 and unidirectional current carrying device 42 would provide a sensitivity in the "raise" direction greater than in the "lower" direction of motor rotation. That is, it would take less net effect of fields 20 and 21 to provide a given speed of motor 10, dependent upon which field 20 or 21 predominated. Thus, the control system can be balanced at the normal value of the regulated quantity, but can be given greater sensitivity for one direction of rotation of the motor than for the other direction of rotation of the motor.

Although but two embodiments of the present invention have been illustrated and described it will be apparent to those skilled in the art that various changes and modifications may be made therein without departing from the spirit of the invention or from the scope of the appended claims.

It is claimed and desired to secure by Letters Patent:

1. In a motor control system, a movable element, a motor operable in either of two directions for moving said element, a generator having the armature thereof directly connected to the armature of said motor, control field means on said generator for providing a terminal voltage thereon in response to operation of said movable element, self-energizing field means connected in circuit with said generator, resistance means in circuit with said self-energizing field means, and a unidirectional current carying device in circuit with said resistance means for shunting a portion thereof only when the terminal voltage of said generator is of one polarity.

2. In a motor control system, a motor rotatable in either direction and provided with a directionally unbalanced load, a generator for supplying effective operational energization for said motor, means for controlling said generator in accordance with conditions of said load, said means comprising differentially connected field windings on said generator arranged to have zero net effective energization when said load conditions are normal, said means further comprising a self-energizing field winding on said generator, and means for varying the effect of said self-energizing field winding dependent upon the direction in which said motor is to be rotated.

3. In a motor control system, a motor rotatable in either direction and provided with a directionally balanced load, a generator for supplying effective operational energization for said motor, means for controlling said generator in accordance with conditions of said load, said means comprising differentially connected field windings on said generator arranged to have zero net effective energization when said load conditions are normal, said means further comprising a self-energizing field winding on said generator, and means for varying the sensitivity of said controlling means dependent upon the direction in which said motor is to be rotated.

4. In a control system for an electric arc furnace, a movable electrode, means for counterbalancing the weight of said electrode, a motor for operating said electrode, a source for supplying energy to said electrode motor in either of two polarities for rotating said electrode motor in either of two directions, said source including a generator having a plurality of control field windings energized in accordance with the electrical conditions of said arc, said generator also having a self-energizing field winding energized in accordance with the energization of said generator to increase the rate of voltage change thereof, and means for varying the sensitivity of response of said generator to said control field windings dependent upon the polarity of said generator, said last mentioned means comprising means operative in response to the polarity of said generator for varying the energizing effect on said generator of said self-energizing field.

5. In a control system for an electric arc furnace, a movable electrode, a motor for operating said electrode, a source for supplying energy to said electrode motor in either of two polarities for rotating said electrode motor in either of two directions, said source including a generator having a plurality of control field windings energized in accordance with the electrical conditions of said arc, said generator also having a self-energizing field winding energized in accordance with the energization of said generator to increase the rate of voltage change thereof, and means operatively responsive to the polarity of said generator for varying the energizing effect of said self-energizing field winding on said generator.

6. In a control system for an electric arc furnace, a movable electrode, a motor for operating said electrode, a source for supplying energy to said electrode motor in either of two polarities for rotating said electrode motor in either of two directions, said source including a generator having a plurality of control field windings energized in accordance with the electrical conditions of said arc, said generator also having a self-energizing field winding energized in accordance with the energization of said generator to increase the rate of voltage change thereof, and means for varying the sensitivity of response of said control system dependent upon the direction of rotation of said motor.

7. In a control system for an electric arc furnace, a movable electrode, a motor for operating said electrode, a source for supplying energy to said electrode motor in either of two polarities for rotating said electrode motor in either of two directions, said source including a generator having a plurality of control field windings energized in accordance with the electrical conditions of said arc, said generator also having a self-energizing field winding energized in accordance with the energization of said generator to increase the rate of voltage change thereof, a resistance in circuit with said self-energizing field, and a unidirectional current carrying device connected across a portion of said resistance.

8. In a control system for an electric arc furnace, cooperating electrodes including a movable electrode, and means for electrically counterbalancing the weight of said movable electrode, said means comprising a motor operatively connected to said movable electrode, said means further comprising a source for supplying energy to said electrode motor in either of two polarities for rotating said electrode motor in either of two directions, said source including a generator having a plurality of control field windings energized in accordance with the electrical conditions of an arc drawn between said electrodes, said generator also having additional field winding means energized in degree and direction dependent upon the value and direction of the output voltage of said generator to increase the rate of voltage change thereof, said counterbalancing means further comprising means operatively responsive to the polarity of said output voltage for varying the energizing effect on said generator of said additional field winding means.

9. In a control system for an electric arm furnace, cooperating electrodes including a movable electrode, an energizing circuit for said electrodes, a motor operatively connected to said movable electrode, a source for supplying electrical energy to said electrode motor in either of two polarities for rotating said electrode motor in either of two directions, said source including a generator having control field winding means energized in accordance with the electrical conditions of said electrode energizing circuit, and means operatively responsive to the polarity of said generator for controlling the energization of said motor to electrically counterbalance the weight of said movable electrode, said last mentioned means comprising means for maintaining the sensitivity of response of said generator to said control field winding means independent of the direction of rotation of said motor.

10. In a control system for an electric arc furnace, a movable electrode, a motor for operating said electrode, a source for supplying energy to said electrode motor in either of two polarities for rotating said electrode motor in either of two directions, said source including a generator having a plurality of control field windings energized in accordance with the electrical conditions of said arc, said generator also having additional field winding means connected in shunt circuit to the armature thereof, a resistance in circuit with said additional field winding means, and means including a unidirectional current carrying device connected in circuit with said resistance whereby the current in said shunt circuit is varied dependent upon the direction of flow of said current.

THOMAS H. BLOODWORTH.

REFERENCES CITED

The following references are of record in the file of this patent:

UNITED STATES PATENTS

| Number | Name | Date |
|---|---|---|
| 1,989,546 | Chapman (1) | Jan. 29, 1935 |
| 2,007,751 | Chapman (2) | July 9, 1935 |
| 2,311,462 | Neal | Feb. 16, 1943 |

FOREIGN PATENTS

| Number | Country | Date |
|---|---|---|
| 373,735 | Great Britain | June 2, 1932 |
| 629,620 | France | Aug. 1, 1927 |